UNITED STATES PATENT OFFICE.

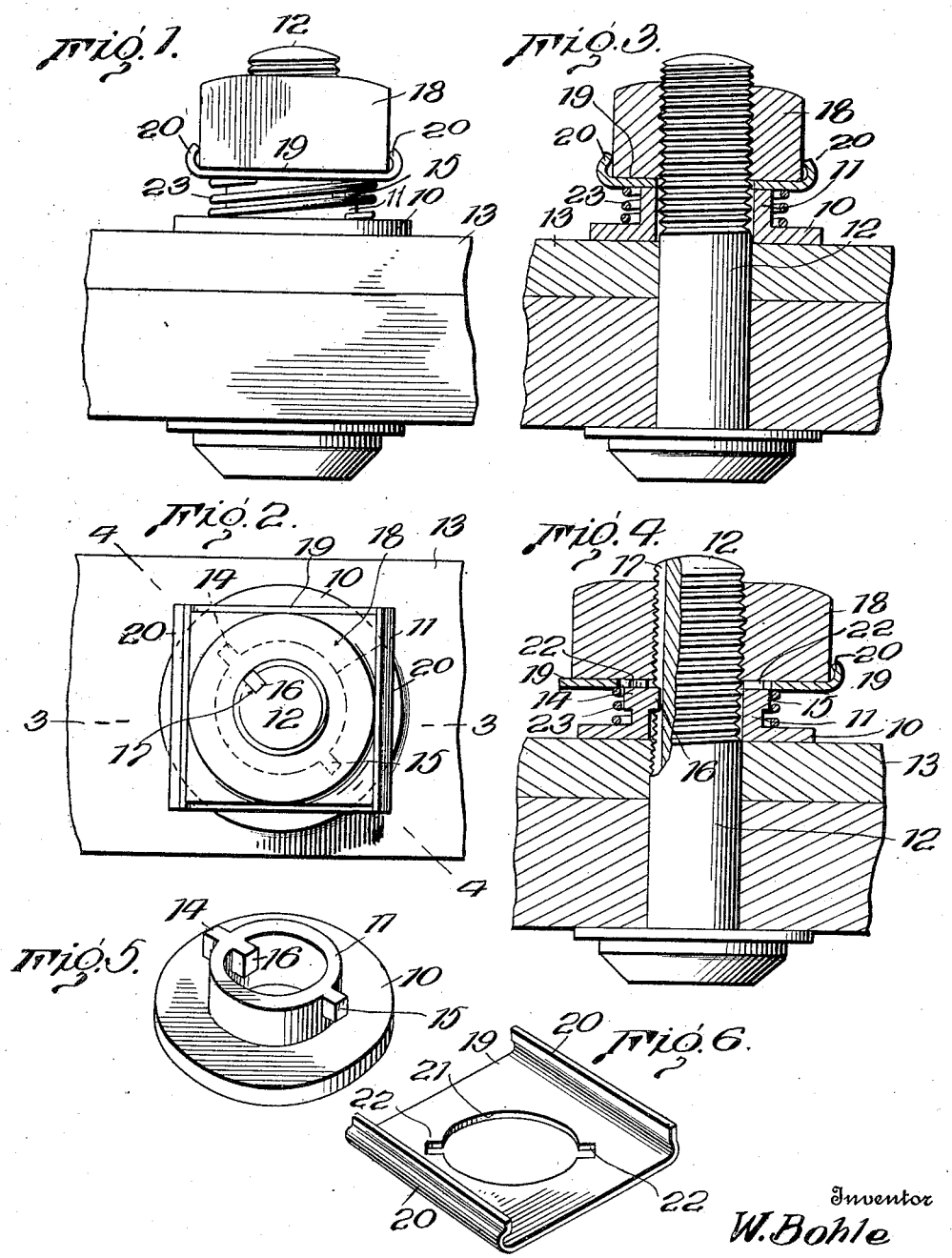

WILLIAM BOHLE, OF CORRECTIONVILLE, IOWA.

NUT-LOCK.

1,189,656.  Specification of Letters Patent.  Patented July 4, 1916.

Application filed November 10, 1915. Serial No. 60,741.

*To all whom it may concern:*

Be it known that I, WILLIAM BOHLE, a citizen of the United States, residing at Correctionville, in the county of Woodbury and State of Iowa, have invented certain new and useful Improvements in Nut-Locks, of which the following is a specification.

This invention relates to improvements in devices for preventing the retrograde movement of nuts upon bolts, and has for one of its objects to simplify and improve the construction and increase the efficiency and utility of devices of this character.

Another object of the invention is to provide a device of this character which may be applied to nuts and bolts of various sizes and to nuts and bolts employed for various purposes and without changing the structure of the nut and without materially changing the structure of the bolt or weakening the latter.

With these and other objects in view, the invention consists in certain novel features of construction as hereinafter shown and described and then specifically pointed out in the claims; and in the drawings illustrative of the preferred embodiment of the invention.

Figure 1 is a side elevation of the improved device applied; Fig. 2 is a plan view of the parts shown in Fig. 1; Fig. 3 is a vertical section on the line 3—3 of Fig. 2; Fig. 4 is a vertical section on the line 4—4 of Fig. 2; Fig. 5 is a detached perspective view of the holding washer; Fig. 6 is a detached perspective view of the nut locking plate.

Corresponding and like parts are referred to in the following description and indicated in all the views of the drawings, by the same reference characters.

The improved device includes a washer-like device having a relatively wide base 10 and a cylindrical upwardly directed portion 11, the base and the portion 11 being integral and surrounding the threaded portion of the bolt, indicated as a whole at 12. The base portion 10 is designed to rest upon the body of the structure 13 through which the bolt passes, and the cylindrical portion 11 is provided with outwardly directed lugs 14—15 and an inwardly directed stud 16. The lugs 14—15 are preferably arranged at opposite sides of the member 11, while the stud 16 is preferably in alinement with one of the studs, for instance the stud 14, but the lugs and the stud may be at other points relative to the portion 11, if desired. The bolt 12 is provided with a longitudinally directed channel, or groove, 17 transversely of its threaded portion, as represented in Figs. 2 and 4, and the stud 16 is designed to enter this channel, as represented in Fig. 4. By this means the washer is prevented from rotating upon the bolt, as hereinafter explained.

The nut is represented as a whole at 18, and disposed upon the bolt between the nut 18 and the cylindrical portion 11 of the washer is a metal plate comprising a body portion 19 and upwardly directed sides 20. The plate 19 is provided with an aperture illustrated at 21 in Fig. 6 slightly larger than the cylindrical portion 11 and with lateral recesses 22 to engage over the lugs 14—15 when the member 19 is disposed in one position. A spring 23 is disposed around the cylindrical portion 11 of the washer and between the base 10 of the washer and the lower face of the locking member 19, as shown in Figs. 1, 3 and 4.

To apply the improved device the washer member 10—11 is first disposed over the threaded portion of the bolt with the stud 16 within the channel 17 and the flange 10 in contact with the body 13 through which the bolt extends. The spring 23 is then located over the cylindrical portion 11 of the washer. The plate is then located over the cylindrical portion 11 of the washer with the recesses 22 in vertical alinement with the lugs 14—15 and the plate 19 forced downwardly against the resistance of the spring until the upper surface of the plate is below the lower lines of the lugs 14—15. The plate is then turned slightly to bring the solid portion of the plate beneath the lugs which then operate to hold the plate depressed so that the upwardly projecting sides 20 will be disposed below the upper line of the cylindrical portion 11 of the washer. The nut 18 is then applied and turned home against the cylindrical portion 11 of the washer. The plate 19 is then rotated until the recesses 22 are again in alinement with the lugs 14—15 when the reaction of the spring 23 will force the plate outwardly against the portion of the nut which projects beyond the cylindrical portion 11 of the washer with the outwardly directed side portions 20 against the sides of the nut and the lugs 14—15 retained within the recesses 22. The nut 18 is thus firmly locked in position relative to the bolt and prevented from all retro-grade movement thereon. If the nut is to be released the plate 19, together with its projecting portions 20, is forced downwardly against the resistance of the spring 23 until the plate is beneath the lower line of the lugs 14—15 when the plate can be rotated to its former position and held downwardly to release the nut which can then be removed in the ordinary manner and without detaching any of the parts.

The improved device is simple in construction, can be inexpensively manufactured, and applied, and can be repeatedly used without injury to the parts, as no parts are destroyed or detached during the operations either of applying the device or releasing the bolt.

Having thus described the invention, what is claimed as new is:—

1. In a nut lock, a bolt having a longitudinal channel, a washer member including a cylindrical portion engaging around the bolt and having outwardly directed lugs and an inwardly directed stud slidably engaging said channel, a locking member having outturned portions adapted to engage a nut upon the bolt and apertured to engage around the washer, said apertures having radial recesses to engage over said lugs, and a spring yieldably supporting said locking member.

2. In a nut lock a bolt having a longitudinal channel, a washer engaging around the bolt and having an inwardly directed stud slidably engaging said channel, a locking member having outturned portions adapted to engage a nut upon the bolt and apertured to engage around the washer, means for preventing said plate from rotating on said washer, and yieldable means for holding said locking plate in engagement with said nut and washer.

3. The combination with a bolt and a nut, of a washer device surrounding said bolt, means for preventing the rotation of said washer device upon the bolt, a locking member having means for engaging said nut and slidable longitudinally of said washer device to withdraw the locking member from engagement with the nut, and means for holding said locking member in withdrawn position.

4. The combination with a bolt and a nut, of a washer device surrounding said bolt, means for preventing the rotation of said washer device upon said bolt, a locking member having means for engaging said nut and slidable longitudinally of said washer device to withdraw the locking member from engagement with the nut, yieldable means for holding said locking member in engagement with the nut, and means for holding the locking member in withdrawn position against the resistance of said yieldable means.

In testimony whereof, I affix my signature.

WILLIAM BOHLE. [L. S.]

Copies of this patent may be obtained for five cents each, by addressing the "Commissioner of Patents, Washington, D. C."